US012774117B1

(12) United States Patent
Gupta et al.

(10) Patent No.: US 12,774,117 B1
(45) Date of Patent: Oct. 27, 2026

(54) UNMANNED AERIAL VEHICLE (UAV) COMPRISING HIGH-STRENGTH REACTIVE ALLOY(S)

(71) Applicant: Washington State University, Pullman, WA (US)

(72) Inventors: Yogendra M. Gupta, Pullman, WA (US); Atakan Peker, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 18/971,512

(22) Filed: Dec. 6, 2024

Related U.S. Application Data

(60) Provisional application No. 63/608,009, filed on Dec. 8, 2023.

(51) Int. Cl.
*B64U 20/60* (2023.01)
*C22C 45/00* (2023.01)

(52) U.S. Cl.
CPC .............. *B64U 20/60* (2023.01); *C22C 45/00* (2013.01)

(58) Field of Classification Search
CPC ............ B64U 2101/15; B64U 2101/18; B64U 2101/19; F42B 12/22
See application file for complete search history.

(56) References Cited

U.S. PATENT DOCUMENTS

| | | | | | |
|---|---|---|---|---|---|
| 5,288,344 | A * | 2/1994 | Peker | C22C 45/10 | 148/403 |
| 5,368,659 | A * | 11/1994 | Peker | C22C 45/10 | 148/672 |
| 5,618,359 | A * | 4/1997 | Lin | C22C 45/10 | 148/435 |
| 5,735,975 | A * | 4/1998 | Lin | C22C 45/10 | 148/403 |
| 7,244,321 | B2 * | 7/2007 | Kim | C22C 1/11 | 148/561 |
| 9,702,676 | B1 * | 7/2017 | Gupta | C22C 45/10 | |
| 10,259,560 | B2 * | 4/2019 | Ivans | B64U 20/40 | |
| 10,267,608 | B2 * | 4/2019 | Gupta | C22C 45/10 | |
| 11,326,863 | B2 * | 5/2022 | Rami | B64U 70/70 | |
| 11,845,553 | B1 * | 12/2023 | Buttermore | B64C 39/024 | |
| 11,988,488 | B2 * | 5/2024 | Parker | G01S 1/7034 | |
| 2010/0051741 | A1 * | 3/2010 | Ismailov | B64U 30/12 | 244/54 |
| 2023/0266106 | A1 * | 8/2023 | Parker | F42B 12/365 | 244/3.15 |

OTHER PUBLICATIONS

Sarac, B., Ketkaew, J., Popnoe, D. O., Schroers, J., Honeycomb Structures of Bulk Metallic Glasses, Advanced Functional Materials, Wiley, Feb. 24, 2012 https://advanced.onlinelibrary.wiley.com/doi/epdf/10.1002/adfm.201200539 (Year: 2012).*

* cited by examiner

*Primary Examiner* — Arfan Y. Sinaki
(74) *Attorney, Agent, or Firm* — Lee & Hayes, P.C.

(57) ABSTRACT

An unmanned aerial vehicle (UAV) includes a fuselage, one or more wings, one or more munitions, and a high-strength reactive alloy that forms at least a portion of the fuselage or the one or more wings. The high-strength reactive alloy is configured to fragment to generate at least one of a blast or projectiles upon impact of the UAV on a target.

20 Claims, 4 Drawing Sheets

UNMANNED AERIAL VEHICLE (UAV) COMPRISING HIGH-STRENGTH REACTIVE ALLOY(S)

CROSS-REFERENCE TO RELATED APPLICATIONS

This application claims priority to U.S. Provisional Patent Application No. 63/608,009, filed Dec. 8, 2023, entitled "Drone Structures with High-Strength Reactive Alloys," the entirety of which is herein incorporated by reference.

BACKGROUND

Drones, or unmanned aerial vehicles (UAVs), have become increasingly popular for reconnaissance, surveillance, and/or airstrike missions. More recently, drones have been used in loitering mission in which drones with onboard munitions are crashed into a target and expensed for destructive purposes. While missiles may accomplish the same goal, drones are often stealthier, more easily maneuverable, and more resourceful to manufacture. However, because of their limited payload capacity, drones also have limited destructive ability. Particularly, the structure and structural components of drones contribute little, if any, to the destructive ability. Additionally, drones are often made of fragile materials and are vulnerable to counter-drone measures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
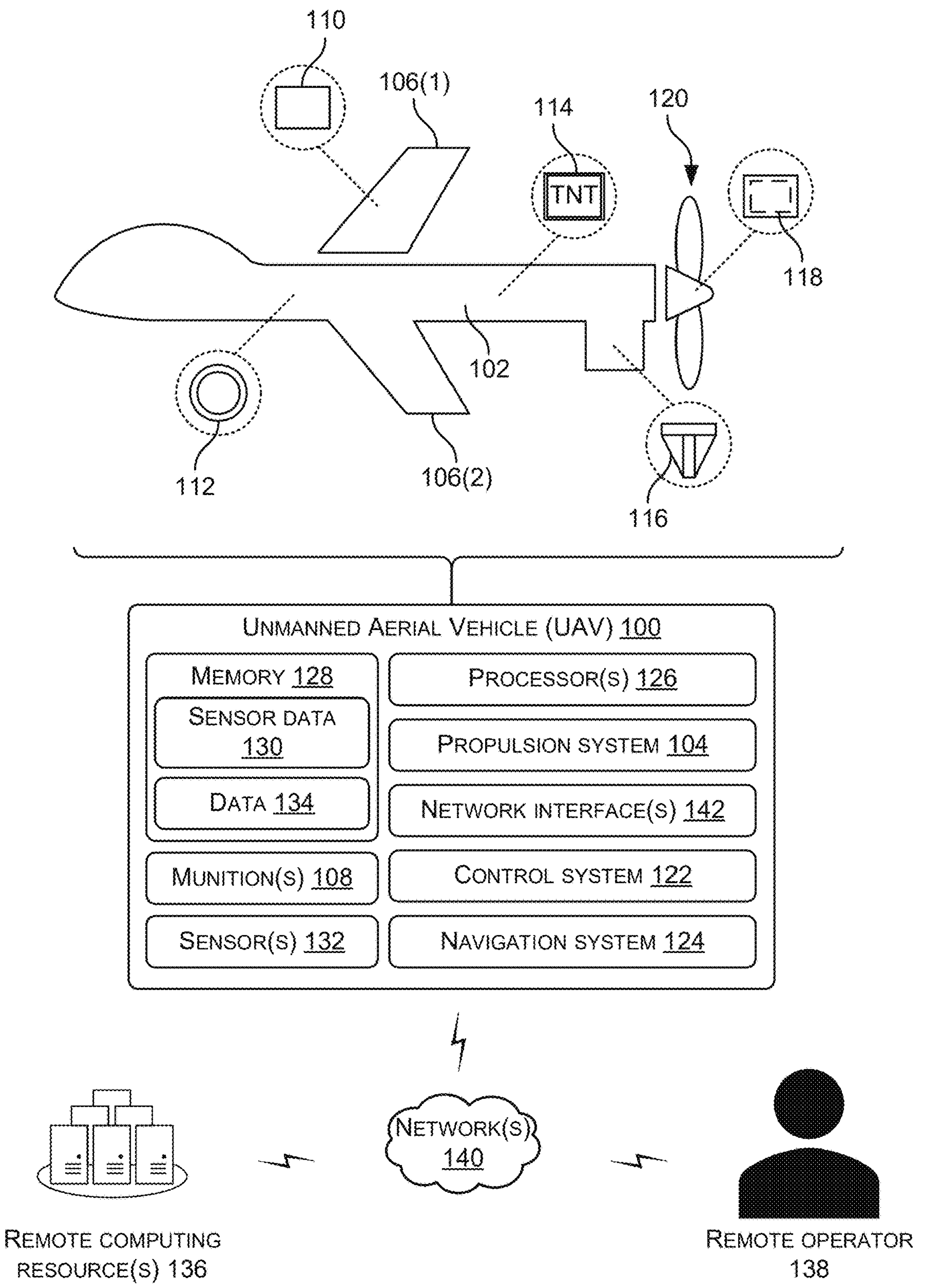
FIG. 1 illustrates an example UAV with a high-strength reactive alloy, according to an example of the present disclosure.

This application is directed, at least in part, to a UAV comprising one or more high-strength reactive alloys. In some instances, the UAV may include a main body, a propulsion system, a control system, and aerodynamic components. The main body, or fuselage, is primarily designed to provide structure to the UAV. The propulsion system may include electrically driven motors (e.g., batteries), an internal combustion engine (e.g., hydrogen, gas, etc.), and/or hybrid systems. The propulsion system may also include propellers, rotors, fans, etc., to move the UAV about an environment. The control system may operate and direct operation of the UAV, while the aerodynamic components assist in moving, flying and steering the UAV about the environment. In some instances, the high-strength reactive alloys may be incorporated into the main body, the propulsion system, the aerodynamic components, or other frames, members etc., of the UAV. In doing so, parts of the UAV that are conventionally considered parasitic weight may be used to increase a destructiveness of the UAV in loitering or attack missions.

The term "reactive alloy" may refer to a metallic alloy with a high affinity to oxygen and/or nitrogen. In some instances, a reactive alloy may include early transition metals with a high affinity to oxygen such that oxide-free surfaces readily react and combust with oxygen (e.g., ambient oxygen). Examples of transition metals may include, but are not limited, to Zirconium (Zr), Titanium (Ti), and Niobium (Nb). Additionally, or alternatively, a reactive alloy may have an enthalpy of oxidation of at least 1,400 calories per gram of alloy. The enthalpy of oxidation of the reactive alloy may be defined as the weighted average of the oxidation enthalpies of the constituent metals within the alloy. However, reactive alloys with other enthalpies of oxidation may be used. For example, the reactive alloy may have an enthalpy of oxidation of at least 1,800 calories per gram of alloy and/or at least 2,000 calories per gram of alloy.

The term "high-strength reactive alloy" may refer to a reactive alloy having a yield strength of at least 120 kilopounds per square inch (ksi) and/or an elastic strain limit of at least 1.2%. The yield strength is the stress level at which the high-strength reactive alloy begins to deform permanently, while the elastic limit is the maximum stress that the high-strength reactive alloy may withstand without permanent deformation. In some instances, the high-strength reactive alloy may have a yield strength of at least 160 ksi and/or an elastic strain limit of at least 1.5%. Alternatively, in some instances, the high-strength reactive alloy may have a yield strength of at least 200 ksi and/or an elastic strain limit of at least 1.8%. Additional details and examples of reactive alloys and/or high-strength reactive alloys are described in, for example, U.S. Pat. No. 10,267,608, the entirety of which is herein incorporated by reference.

In some instances, the high-strength reactive alloys as described herein may have a yield strength of at least 120 ksi, an elastic strain limit of at least 1.2%, and/or an enthalpy of oxidation of at least 1,400 calories per gram of alloy. Alternatively, in some instances, the high-strength reactive alloys as described herein may have a yield strength of at least 160 ksi, an elastic strain limit of at least 1.5%, and/or an enthalpy of oxidation of at least 1,800 calories per gram of alloy. Alternatively, in some instances, the high-strength reactive alloy as described herein may have a yield strength of at least 200 ksi, an elastic strain limit of at least 1.8%, and/or an enthalpy of oxidation at least 2,000 calories per gram of alloy. Although certain combinations of yield strength, elastic strain limit, and/or enthalpy of oxidation are described, the high-strength reactive alloys as described herein may have different yield strengths, elastic strain limits, and/or enthalpies of oxidation.

In some instances, the high-strength reactive alloys may be a metallic glass. Metallic glass may be a metallic alloy with an amorphous atomic structure in the solid state and has an amorphous or glassy phase. Metallic glasses are typically formed by quenching from the liquid state to avoid nucleation and growth of crystalline phases during solidification. Conventionally, metallic glasses may require cooling rates of 105 K/sec or more. Metallic glasses may be limited to thicknesses of 0.020 millimeters (mm) or less. However, the limited thickness of the metallic glass often restricts its use.

A "Bulk Metallic Glass (BMG)" may be a metallic glass capable of being cast into a metallic glass object. BMGs, or bulk amorphous alloys, may be cooled at lower rates than metallic glasses. For example, BMGs may be cooled at 500 K/sec or less. The lower cooling rate allows the BMG to sustain its amorphous atomic structure. As a result, BMGs may be produced in thicknesses of 1.0 mm or more. BMGs may be advantageously used to form objects that are thicker and/or larger than objects formed from a metallic glass. In some instances, the high-strength reactive alloy may be a Zr-based BMG, and the Zr-based BMG may have a thickness less than 10 mm, less than 5 mm, or less than 2 mm. Examples of BMGs are described in U.S. Pat. Nos. 5,288,344, 5,368,659, 5,618,359, and 5,735,975, the entirety of which are incorporated herein by reference.

In some instances, crystalline precipitates in BMGs may be detrimental to their properties. For example, crystalline precipitates may adversely impact toughness and strength. However, in some instances, crystalline precipitates may be beneficial to the properties of BMG, such as toughness and ductility. Cast reactive alloys may be heat treated to provide precipitation of fine crystallite precipitates ranging from a few nanometers to a few micrometers, and at varying volume fractions. In other instances, beneficial crystalline precipitates may be formed in-situ during casting of BMGs. Accordingly the BMGs as disclosed herein have varying sizes and/or amounts of crystalline precipitates based on desired properties. Generally, however, the critical cooling rates of the BMG may be controlled to minimize the adverse impacts, or amount, size, etc., of the crystalline precipitates. Example bulk amorphous alloys including beneficial crystalline precipitates are disclosed in U.S. Pat. No. 7,244,321, the entirety of which is incorporated herein by reference.

In some instances, a "metallic glass object" or "metallic glass form", as described herein, may include at least 70% amorphous phase by volume, or in some instances, at least 95% amorphous phase by volume. These measurements may equivalently apply to "articles of bulk metallic glass" as described herein. In some instances, the high-strength reactive alloy may be a metallic glass. In some instances, the high-strength reactive alloy may be a BMG. In some instances, the high-strength reactive alloy may be considered lightweight, where a density of the high-strength reactive alloy may be less than 6.6 grams per cubic centimeter (g/cc), or in some instances, less than 5.5 g/cc.

Incorporating high-strength reactive alloys within the UAV may increase its destructiveness. For example, the high-strength reactive alloys, upon impact on a target, may rapidly and simultaneously impart mechanical energy (e.g., kinetic energy, penetration, and/or fragmentation) and chemical energy (e.g., blast and/or fireball). In some instances, the high-strength reactive alloys may be fragmented by rapid impulsive loading during the impact of the UAV onto the target. Alternatively, instead of the high-strength reactive alloys fragmenting based on impact of the UAV on a target, munitions onboard the UAV may be used to fragment the high-strength reactive alloys. For example, detonation of the munitions may fragment the high-strength reactive alloys.

Regardless of the specific embodiment, the fragments of the high-strength reactive alloys may initiate a combustion reaction with the ambient atmosphere and produce a rapid pressure increase facilitated by the enthalpic energy of the combustion reaction. In some instances, one or more resulting fragments of the high-strength reactive alloy may initiate a combustion reaction with available oxygen and nitrogen in the environment. The intrinsic chemical energy of the high-strength reactive alloy may be discharged via the combustion reaction into the environment, thereby producing rapid pressure increase and blast. The pressure increase may also be associated with a fireball and a temperature rise in the environment, thereby providing further destructiveness.

In their bulk solid forms, high-strength reactive alloys are practically inert under normal operating conditions (e.g., ambient temperature and atmosphere). However, as introduced above, high-strength reactive alloy possess significant intrinsic chemical (e.g., enthalpic) energy of up to 2,000 calories per gram of alloy and, in the case of some reactive alloys, even more. The chemical energy may be discharged through a combustion reaction with ambient air, in particular oxygen and/or nitrogen. For example, the combustion reaction may be activated upon by the UAV impacting its target, upon the explosion of payload explosives, munitions onboard the UAV, and/or by another on-demand stimuli. Compared to conventional UAVs, which are dependent on munitions, the use of high-strength reactive alloys within the UAV, or their structure, as disclosed herein, may improve their destructiveness and effectiveness. In some instances, the incorporation of the high-strength reactive alloys produce a significant blast, rapid pressure increase in ambient environment, and as a result, provides significant improvement in destructiveness that is equivalent to using more explosives and heavier munitions. As such, the high-strength reactive alloys may be used to augment the munitions onboard the UAV.

In some instances, the high-strength reactive alloys may sustain large mechanical strains without significant plastic deformation based at least in part on the strength and/or the elastic strain limit. The UAV may store substantial mechanical energy during initial stages of rapid impulsive loading, such as upon impact of the UAV impacting a target. Once fragmentation of the high-strength reactive alloy begins, this stored mechanical energy facilitates the formation of finer and more uniform fragment distribution. This is compared to a fragment distribution of known reactive materials used in conventional munitions systems. The stored mechanical energy from the initial stages of the rapid impulsive loading preceding and/or associated with the initiation of fragmentation may produce a large number of free surfaces, which are oxide-free from the solid bulk form of the high-strength reactive alloy. The opening of the oxide-free surfaces from the high-strength reactive alloys, and especially with the formation of fine and generally uniform fragments, may prompt reaction initiation and increase the destructiveness of the UAV.

The high-strength reactive alloy may be tailored to have a predetermined fragmentation distribution. For example, a shape and/or size of the fragmentation distribution may be varied, and/or a size and/or shape of the fragments may be varied. In some instances, the high-strength reactive alloy may be configured to fragment such that 50% of the fragment distribution may be less than 200 microns in size. Alternatively, in some instances, 80% of the fragment distribution may be less than 200 microns in size. Alternatively, in some instances, 50% of fragment distribution may be smaller than 100 microns. Alternatively, in some instances, 80% of fragment distribution may be less than 100 microns in size. In some instances, the predetermined fragment distribution and the resulting destructiveness characteristics may be tailored by the applied stimuli, such as the relative amount of munitions incorporated within the UAV, the impact speed of UAV on the target, and/or the specific geometric shaping and distribution of high-strength reactive alloy within the structure(s) of the UAV.

In some instances, the high-strength reactive alloy may be configured to fracture into relatively larger fragments to provide kinetic energy projectiles. In such instances, the mechanical impact may be spread and imparted over a larger area. In some instances, at least 50% of the fragment distribution may be more than 2 mm in size. Alternatively, in some instances, at least 80% of the fragment distribution may be more than 2 mm in size, or more than 5 mm in size, to provide a set of kinetic energy projectiles. However, the resulting size of the fragments may be dependent upon an intended target and/or a desired combination of blast versus kinetic energy projectiles.

In some instances, a geometry of the high-strength reactive alloy within the UAV may be leveraged to adjust a shape and/or a size of the fragmentation distribution, a shape and/or a size of the fragments, etc. This geometric leveraging may be achieved by various methods, such as by forming or fabricating the high-strength reactive alloy into a honeycomb structure or into a foam structure to increase a surface-to-volume ratio of the high-strength reactive alloy. In some instances, and for the purposes of this disclosure, a "geometric leveraging factor" (GLF) may be defined as follows: If the high-strength reactive alloy used in a structure of the UAV is fully consolidated and formed into a cubic form, the high-strength reactive alloy may have a GLF of one (i.e., 1.000). The surface-to-volume ratio of the high-strength reactive alloy used in a structure may be calculated and then divided by the surface-to-volume ratio of the same amount of the high-strength reactive alloy in cubic form. For example, when a cube of high-strength reactive alloy with 1.0 cm edge is expanded into a sheet of 0.1 cm thick, 1.0 cm wide, and 10 cm long, the GLF becomes 22.2/6, or 3.7 (i.e., (2(0.1 cm)+2(1.0 cm)+2(10 cm))/(2(1.0 cm)+2(1.0 cm)+2 (1.0 cm)).

In some instances, the high-strength reactive alloy may have a GLF of 3.0 or more, a GLF of 6.0 or more, or a GLF 12.0 or more. In some instances, the high-strength reactive alloy may have a honeycomb structure with GLF of more than 6.0, or a GLF of more than 12.0. In some instances, the high-strength reactive alloy may be incorporated into a tubular structure with GLF of more than 3.0, or more than 6.0. In some instances, the high-strength reactive alloy may be incorporated into a rectangular tubular structure with GLF of more than 3.0, or more than 6.0.

In some instances, the UAV may comprise, or be at least partially manufactured from, one or more of the high-strength reactive alloy(s). For example, the fuselage, aerodynamic components such as wings, and/or other components (e.g., frame, mounts, brackets, etc.) of the UAV may include, or be at least partially made of, the high-strength reactive alloy(s). Moreover, more than one of the high-strength reactive alloys may be used within the UAV. As an example, a first component of the UAV may be manufactured from a first high-strength reactive alloy with first characteristics. A second component of the UAV may be manufactured from a second high-strength reactive alloy with second characteristics that are different than the first characteristics. The first component may correspond to a fuselage (or a panel of the fuselage), while the second component may correspond to a wing (or a panel of the wing). The differing characteristics of the high-strength reactive alloy may have different fragmentation distributions, fragments, etc. In some instances, the UAVs, the components, and/or the high-strength reactive alloy(s) may be based at least in part on a target of the UAV, a mission of the UAV, an environment of the UAV, etc.

As introduced above, in addition to the high-strength reactive alloy, the UAV may include internal and/or external munitions. Munitions may include "explosive(s)" and/or "high explosive(s)". As used herein, these "explosives" may be conventional explosives such as TNT, HMX, and/or RDX. In some instances, the high-strength reactive alloys may at least partially wrap, cover, and/or enclose the munitions.

Additionally, in some instances, the high-strength reactive alloys may be at least partially wrapped, covered, and/or enclosed in plastics, polymer composites, metals, carbon fiber composites, etc. Wrapping of the high-strength reactive alloys may reduce a vulnerability of the UAV to anti-aircraft countermeasures and/or provide weight savings. In addition, wrapping the high-strength reactive alloys may prevent inadvertent or premature fragmentation.

As used herein, a UAV may include or be representative of a drone, aircraft, helicopter, etc. The UAV may be remotely controlled and/or autonomously controlled. The UAV may also include various sensors, such as a camera(s), LIDAR, RADAR, GPS, etc., that generate sensor data to assist in moving the UAV about the environment. The control system may process the sensor data to permit the UAV to move about the environment, and/or may be sent to one or more remote device(s), system(s), server(s), etc. For example, a remote device(s) may receive the sensor data and may be used by personnel to control the UAV remotely.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 illustrates an example UAV 100 having high-strength reactive alloy(s) integrated within one or more components of the UAV 100, according to an example of the present disclosure. Incorporating the high-strength reactive alloy(s) into components, structures, etc., of the UAV 100 may increase its versatility and use. For example, the UAV 100 may be used in loitering, surveillance, and/or reconnaissance missions, some or all of which could be utilized to increase its effectiveness and destructiveness.

The UAV 100 may include a fuselage 102, a propulsion system 104 (e.g., engines, propellers, etc.), and aerodynamic components, such as a first wing 106(1) and a second wing 106(2), control surfaces, such as rudders, aileron, flaps, elevators, stabilizers, etc. The fuselage 102 may define a structure of the UAV 100, such as a main body or frame of the UAV 100, and other components may reside within the fuselage 102.

The UAV 100 may include any number of engines, propellers, fans, etc., that make up the propulsion system 104. In some instances, the propulsion system 104 may be powered via batteries, fuel (e.g., gasoline, hydrogen, etc.), solar, etc. While a particular illustration of the UAV 100 is shown (e.g., the wings 106 being located at a certain location, etc.), other variations of UAVs are envisioned. For example, the propulsion system 104 may include more than one propellor or may include rotors (e.g., helicopter-style UAV). Moreover, although referred to herein as a UAV, the UAV 100 may be alternatively referred to as, or represent, other drones, planes, helicopters, etc. Still, although FIG. 1 illustrates a single UAV, one or more of the UAV 100 may be used.

Conventionally, the fuselage, wings, etc., of UAVs are made of lightweight plastics such as ABS, polycarbonate, and polypropylene, polymer composites, metals, etc. These materials may provide weight savings. However, despite their weight savings, these materials do not increase or add to a destructiveness of UAVs. In this manner, these materials are parasitic or inert. Instead, the UAVs may rely on onboard munitions for their destructiveness. Compared to conventional UAVs, the UAV 100 as described herein may include, and/or be at least partially manufactured from, the high-strength reactive alloy(s).

In some instances, the high-strength reactive alloy may be fragmented by rapid impulsive loading during the impact of the UAV 100 onto a target. In some instances, the high-strength reactive alloy may sustain mechanical strains without significant plastic deformation, given the strength and the elastic strain limit of the high-strength reactive alloy. In some instances, the UAV 100 may store mechanical energy during initial stages of rapid impulsive loading, such as in the case where the UAV 100 impacts the target. Alternatively, instead of the high-strength reactive alloy fragmenting upon impact, munition(s) 108 onboard the UAV 100 may be used to fragment the high-strength reactive alloys. For example, detonation of the munition(s) 108 may fragment the high-strength reactive alloys.

Once the high-strength reactive alloy is fragmented, the stored mechanical energy facilitates a fragment distribution. For example, the stored mechanical energy from the initial stages of the rapid impulsive loading preceding and/or associated with the initiation of fragmentation produces a large amount of free surfaces of the high-strength reactive alloy. The resulting fragments of the high-strength reactive alloys may initiate a combustion reaction with the ambient atmosphere and produce a rapid pressure increase facilitated by the enthalpic energy of the combustion reaction. In some instances, one or more resulting fragments of the high-strength reactive alloy may initiate a combustion reaction with available oxygen and nitrogen in the environment. The intrinsic chemical energy of the high-strength reactive alloy may be discharged via the combustion reaction into the environment, thereby producing rapid pressure increase and blast. The pressure increase may also be associated with a fireball and a temperature rise in the environment, thereby providing further destructiveness. In this manner, the high-strength reactive alloys may augment the munition(s) 108 onboard the UAV 100. In some instances, the combustion reaction of the high-strength reactive alloy may be activated by the UAV 100 impacting its target, upon the explosion of payload explosives, the munition(s) 108 onboard the UAV 100, and/or by another on-demand stimuli.

In some instances, portions of the fuselage 102, the wings 106, etc., may be manufactured from the high-strength reactive alloy(s). Additionally, or alternatively, various frames, brackets, structural components, struts, etc., internal to the fuselage 102, the wings 106, etc., may be manufactured from the high-strength reactive alloy(s). For example, in FIG. 1, a panel 110 of the wing 106(1) may be manufactured from a high-strength reactive alloy, a portion 112 of the fuselage 102 may be manufactured from a high-strength reactive alloy, a sleeve 114 disposed around the munition(s) 108 may be manufactured from a high-strength reactive alloy, a bracket 116 may be manufactured from a high-strength reactive alloy, and/or a cap 118 of a propeller 120 may be manufactured from a high-strength reactive alloy and wrapped with another material (e.g., plastics, polymer composites, metals, carbon fiber composites). The high-strength reactive alloys of the panel 110, the portion 112 of the fuselage 102, the sleeve 114, the bracket 116, and/or the cap 118 may be different or similar to one another. The differing characteristics of the high-strength reactive alloy may have different fragmentation distributions, fragment size, destruction, etc. In some instances, the UAV 100, the components, and/or the high-strength reactive alloy(s) may be based at least in part on a target of the UAV 100, a mission of the UAV 100, an environment of the UAV 100, etc.

Although particular portions of the UAV 100 are shown being manufactured from the high-strength reactive alloys, or employing the high-strength reactive alloys, other variations are envisioned. For example, the propeller 120 of the propulsion system 104 may be manufactured from a high-strength reactive alloy. The high-strength reactive alloys, as incorporated into the UAV 100, may also take many structural shapes or forms, such as being flat, tubular, semi-circular, spherical, etc.

In some instances, the high-strength reactive alloys may have a yield strength of at least 120 ksi, an elastic strain limit of at least 1.2%, and/or an enthalpy of oxidation of at least 1,400 calories per gram of alloy. Alternatively, in some instances, the high-strength reactive alloy may have a yield strength of at least 160 ksi, an elastic strain limit of at least 1.5%, and/or an enthalpy of oxidation of at least 1,800 calories per gram of alloy. Alternatively, in some instances, the high-strength reactive alloy may have a yield strength of at least 200 ksi, an elastic strain limit of at least 1.8%, and/or an enthalpy of oxidation at least 2,000 calories per gram of alloy. Although certain combinations of yield strength, elastic strain limit, and/or enthalpy of oxidation are described, the high-strength reactive alloys as described herein may have different yield strengths, elastic strain limits, and/or enthalpies of oxidation.

In some instances, the high-strength reactive alloy may be a BMG capable of being cast into a metallic glass object. BMGs may be advantageously used to form objects that are thicker and/or larger than objects formed from a metallic glass. In some instances, the high-strength reactive alloy may be a Zr-based BMG, and the Zr-based BMG may have a thickness of less than 10 mm, less than 5 mm, or less than 2 mm. In some instances, the high-strength reactive alloy may be considered lightweight. A density of the high-strength reactive alloy may be less than 6.6 grams per cubic centimeter (g/cc) or in some instances, less than 5.5 g/cc.

The high-strength reactive alloy may be tailored to have a predetermined fragmentation distribution. For example, a shape and/or size of the fragmentation distribution may be varied, and/or a size and/or shape of the fragments may be varied. In some instances, the high-strength reactive alloy may be configured to fragment such that 50% of the fragment distribution may be less than 200 microns in size, such that 80% of the fragment distribution may be less than 200 microns in size, such that 50% of fragment distribution may be less than 100 microns in size, or such that 80% of fragment distribution may be less than 100 microns in size. Additionally, in some instances, a geometry of the high-strength reactive alloy within the UAV 100 may be leveraged to adjust a shape and/or a size of the fragmentation distribution, a shape and/or a size of the fragments, etc. This geometric leveraging may be achieved by various methods, such as by forming or fabricating the high-strength reactive alloy into a honeycomb structure or into a foam structure to increase a surface to volume ratio of the high-strength reactive alloy.

In some instances, a GLF may be defined as follows: If the high-strength reactive alloy used in a structure of the UAV is fully consolidated and formed into a cubic form, the high-strength reactive alloy may have a GLF of one (i.e., 1.000). The surface-to-volume ratio of the high-strength reactive alloy used in a structure may be calculated and then divided by the surface-to-volume ratio of the same amount of the high-strength reactive alloy in cubic form. For example, when a cube of high-strength reactive alloy with 1.0 cm edge is expanded into a sheet of 0.1 cm thick, 1.0 cm wide, and 10 cm long, the GLF becomes 22.2/6, or 3.7. In some instances, the high-strength reactive alloy may have a GLF of 3.0 or more, a GLF of 6.0 or more, or a GLF 12.0 or more.

In some instances, the GLF may alter the blast, the fragmentation distribution, and/or the fragments. For example, larger GLFs may produce a smaller fragmentation distribution and/or smaller fragments than smaller GLFs. The high-strength reactive alloy may be designed according to the desired fragment size. In some instances, smaller fragments may be associated with a greater blast (e.g., area, coverage, etc.). In comparison, larger fragments may be associated with a reduced blast but an increase in projectile size. Designing the high-strength reactive alloy to have a predetermined GLF may control a blast or projectiles of the high-strength reactive alloy.

In some instances, the fragmentation may also be achieved by forming shapes, grooves, notches, etc., in the high-strength reactive alloy. For example, V-shaped grooves may be formed on one or more surfaces of the high-strength reactive alloy. In some instances, these grooves may be fabricated onto or into the high-strength reactive alloy using various methods, such as direct machining, etching, milling, as-cast shaping and near-to-net shape thermoplastic forming (i.e., thermoforming), in the undercooled liquid state, as in the case of BMGs. When larger projectiles are desired, the grooves may be shaped apart by greater distances and/or disposed by lesser distances into the surface of the high-strength reactive alloy. When smaller projectiles are desired, the grooves may be closer (or more dense) and/or may be formed deeper into the into the surface of the high-strength reactive alloy.

The UAV 100 may include a control system 122 that controls one or more functions or operations of the UAV 100. For example, the control system 122 may control the propulsion system 104 to maneuver the UAV 100 between locations. The control system 122 may operate and direct the operation of the UAV 100, such as controlling the wings 106, the propulsion system 104, and so forth. The UAV 100 may also include a navigation system 124 that directs the UAV 100 to desired locations.

The UAV 100 is shown including processor(s) 126 and memory 128, where the processor(s) 126 may perform various functions and operations associated with the UAV 100, and the memory 128 may store instructions executable by the processor(s) 126 to perform the operations described herein. In some instances, the processor(s) 126 may be configured to analyze sensor data 130 generated by one or more sensor(s) 132 of the UAV 100 for use in controlling the UAV 100. For example, the sensor(s) 132 may include camera(s), LIDAR, RADAR, GPS, etc., that is used to control flight of the UAV 100. The sensor data 130 generated by the sensor(s) 132 may be processed and/or analyzed by the processor(s) 126, or components of the UAV 100, such as the control system 122, the navigation system 124, etc., for use in controlling the UAV 100. In some instances, the control system 122, the propulsion system 104, and/or the navigation system 124 may possess their own processor(s) and/or memory for carrying out their intended operations or may utilize the processor(s) 126 and/or the memory 128.

The memory 128 may also have access to, or store, data 134. The data 134 may be representative of any suitable data, such as targets of the UAV 100, intended destinations, identifier(s) of the UAV 100, characteristic(s) of the UAV 100 (e.g., fragmentation distribution, types of high-strength reactive alloys, etc.), etc.

The UAV 100 may communicatively couple to remote computing resource(s) 136 and/or a remote operator 138 over one or more network(s) 140. The UAV 100 may include network interface(s) 142 for permitting communication over the network(s) 140. In some instances the UAV 100 may send the sensor data 130 and/or the data 134 over the network(s) 140, and/or may receive signals, instructions, and/or other data over the network(s) 140. For example, in some instances, the UAV 100 may be capable of autonomous flight. However, in some instance, the remote operator 138 may additionally or alternatively control flight of the UAV 100. In such instances, a device utilized by the remote operator 138 may send data to the UAV 100 that is used to control one or more operations of the UAV 100. The network(s) 140 may be representative of any suitable time of network (e.g., the Internet, a wireless local area network (WLAN), a cellular network, etc.) and/or by using a short-range wireless protocol, like Bluetooth®, Zigbee®, etc.

The munition(s) 108 may be disposed along, about, on, etc., the fuselage 102, the wings 106, etc. Examples of the munition(s) 108 may include "explosive(s)" and/or "high explosive(s)" such as TNT, HMX, and/or RDX. In some instances, the munition(s) 108 may be internal and/or external munitions.

The remote computing resource(s) 136 may be implemented as one or more servers and may, in some instances, form a portion of a network-accessible computing platform implemented as a computing infrastructure of processors, storage, software, data access, etc., that is maintained and accessible via a network such as the Internet. The remote computing resource(s) 136 does not require end-user knowledge of the physical location and configuration of the system that delivers the services. Common expressions associated with the remote computing resource(s) 136 include "on-demand computing", "software as a service (SaaS)", "platform computing", "network-accessible platform", "cloud services", "data centers", etc.

As used herein, a processor, such as the processor(s) 126 may include multiple processors and/or a processor having multiple cores. Further, the processor(s) 126 may comprise one or more cores of different types. For example, the processor(s) 126 may include application processor units, graphic processing units, and so forth. In one implementation, the processor(s) 126 may comprise a microcontroller and/or a microprocessor. The processor(s) 126 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 126 may possess its own local memory, which also may store program components, program data, and/or one or more operating systems.

Memory, such as the memory 128 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) 126 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 126. The memory 128 is an example of non-transitory computer-readable media. The memory 128 may store an operating system and one or more software applications, instructions, programs, and/or data to implement the methods described herein and the functions attributed to the various systems.

Figure 2:
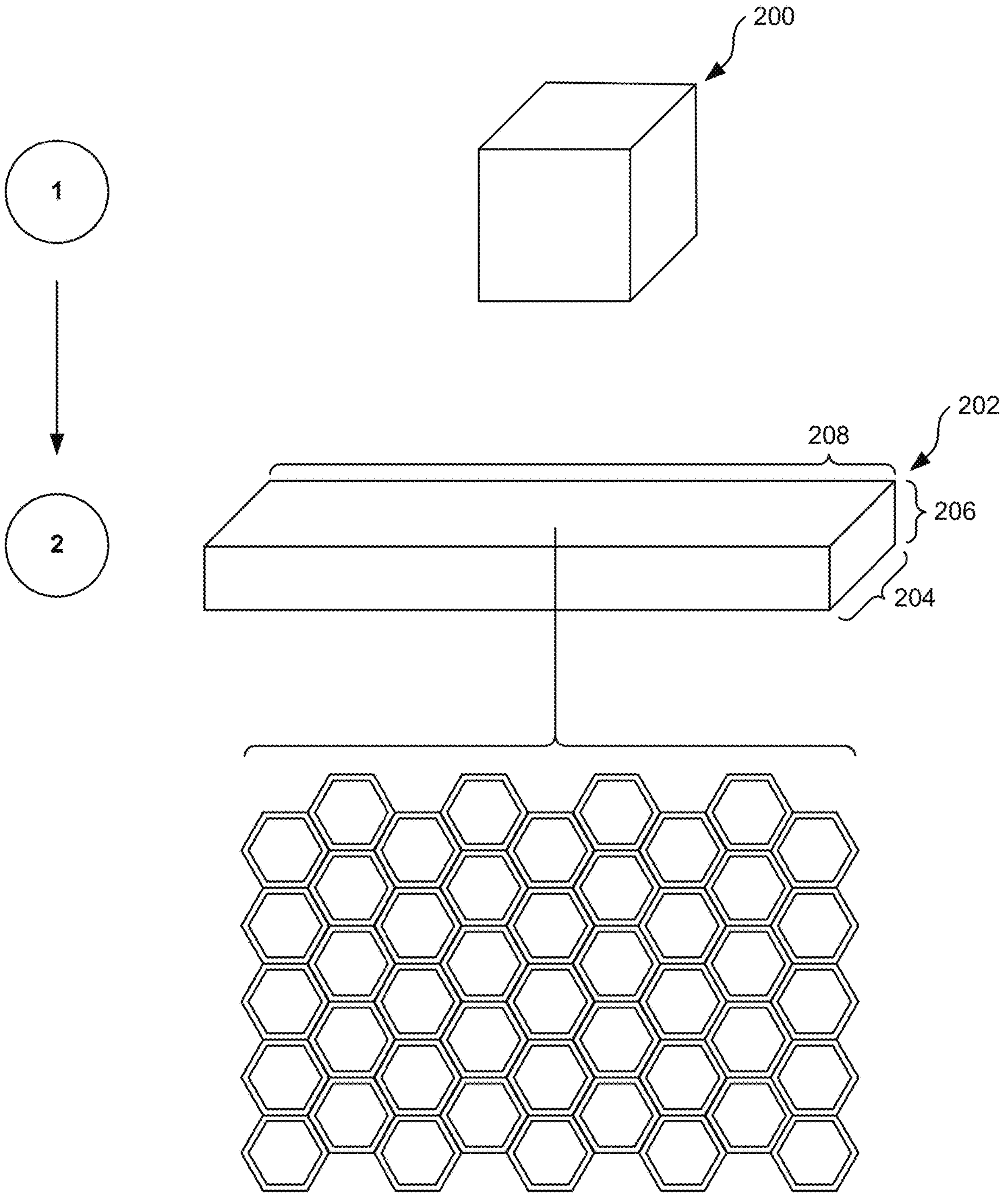
FIG. 2 illustrates an example formation of a high-strength reactive alloy, according to an example of the present disclosure.

FIG. 2 illustrates an example sequence to fabricate a high-strength reactive alloy 200, according to an example of the present disclosure. In some instances, the high-strength reactive alloy 200 may be formed, or formed to include, a geometric leveraging factor (GLF). For example, at "1" in FIG. 2, the high-strength reactive alloy 200 may be in cubic form, with 1.0 cm dimensions. The high-strength reactive alloy 200 may have a GLF of 1.0 in cubic form.

At "2" in FIG. 2, the cube of the high-strength reactive alloy 200 may be expanded (e.g., cast, rolled, etc.) into a sheet 202 with a width 204, a height 206, and a length 208. For example, the high-strength reactive alloy 200 may be expanded into the sheet 202 to form the panel 110. The GLF may represent a ratio of surface areas between the high-strength reactive alloy 200 in cubic form and the high-strength reactive alloy 200 when formed as the sheet 202. In other words, if the material used in a structure of the UAV 100 is fully consolidated and formed into a cube, the material has the GLF of 1.0. The surface area ratio of the material of the sheet 202 may be calculated and then divided by the surface area of the same amount of material in cubic form, as if fully consolidated and formed into a cube. This ratio becomes the GLF.

For purposes of illustrating the GLF, the width 204 may be 1.0 cm, the height 206 may be 0.1 cm, and the length 208 may be 10 cm. The surface area of the high-strength reactive alloy 200 in cubic form may be 6 (i.e., 2(1.0 cm)+2(1.0 cm)+2(1.0 cm)). The surface area of the high-strength reactive alloy 200 as the sheet 202 may be 22.2 (i.e., 2(1.0 cm)+2(0.1 cm)+2(10.0 cm)). The GLF may be 22.2/6, or 3.7.

In some instances, the high-strength reactive alloy 200 may have a GLF of 3.0 or more, a GLF of 6.0 or more, or a GLF 12.0 or more. In some instances, the high-strength reactive alloy 200 may have a honeycomb structure, as shown in FIG. 2, with GLF of more than 6.0, or a GLF of more than 12.0. In some instances, from the honeycomb structure, parts of the UAV 100, such as brackets, flanges, wings, ailerons, panels, plates, beams, etc., may be manufactured via various processing techniques (e.g., molding, cutting, stamping, rolling shaping, etc.). For example, the honeycomb structure may be rolled into a tube to form the fuselage 102. Moreover, the high-strength reactive alloy 200, when incorporated into the UAV 100, or components thereof, may be at least partially wrapped, covered, and/or enclosed in plastics, polymer composites, metals and/or carbon fiber composites. These hybrid structures may reduce a vulnerability of the UAV 100 or the high-strength reactive alloy 200 to anti-aircraft countermeasures while also providing weight savings.

Although shown as a honeycomb structure, the high-strength reactive alloy 200 may be formed as flat sheets, panels, tubes, etc., without the honeycomb structure, or with other structures (e.g., corrugated structures, hollow structures, etc.). Additionally, although a particular shape of the high-strength reactive alloy 200 is shown, in some instances, the high-strength reactive alloy 200 may be incorporated into a tubular structure with GLF of more than 3.0, or more than 6.0. In some instances, the high-strength reactive alloy may be incorporated into a rectangular tubular structure with GLF of more than 3.0, or more than 6.0. Regardless of the specific shape, size, etc., the surface area of the high-strength reactive alloy 200 may be increased by a certain factor, and this increase in surface area may result in an increase in fragmentation, as well as an increase in reactivity when the high-strength reactive alloy fragments.

In some instances, the high-strength reactive alloy 200 may be a BMG. In such instances, the components of the UAV 100 may be manufactured by direct casting of the BMG into metallic molds from above its melting temperatures, resulting in as-cast and near-to-net shape structures. In some instances, the high-strength reactive alloy 200 may be near-to-net shape when cast and have a GLF of 1.2 or more, a GLF of 1.5 or more, or a GLF of 2.0 or more. Additionally, or alternatively, in some instances where the high-strength reactive alloy is a BMG, the components of the UAV 100 may be manufactured by thermoplastic forming of the BMG around or above its glass transition temperature, resulting in near-to-net shape structures. In some instances, the high-strength reactive alloy 200 may be thermos-plastically formed with a GLF of 1.5 or more, a GLF of 2.0 or more, or a GLF 3.0 or more.

Figure 3:
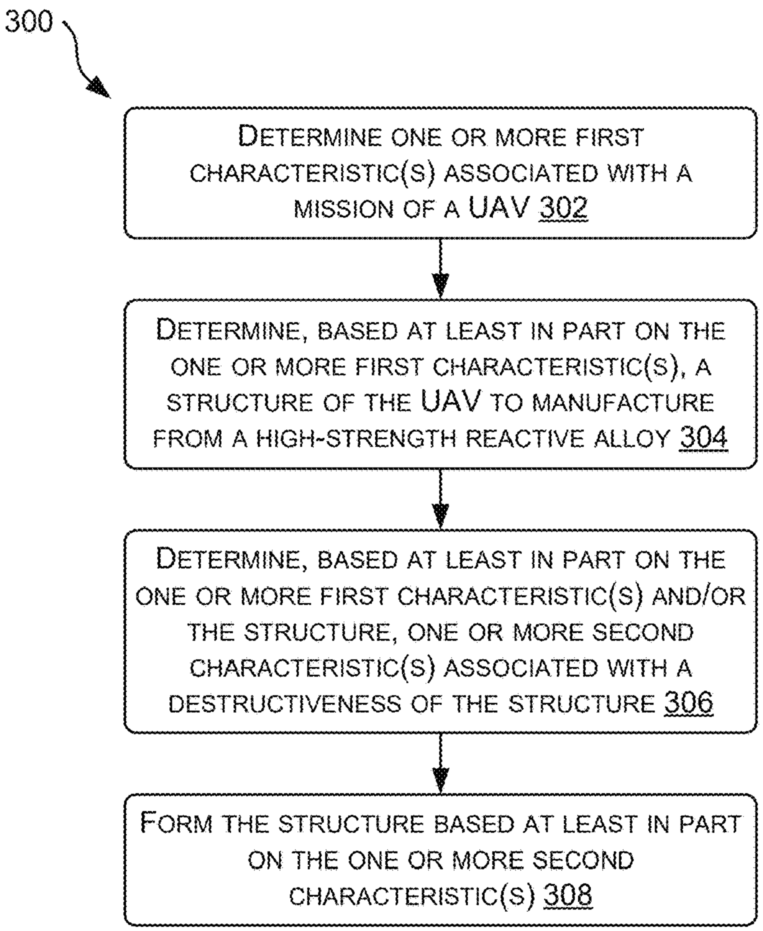
FIG. 3 illustrates an example process associated with determining characteristics of a high-strength reactive alloy of the UAV of FIG. 1, according to an example of the present disclosure.

FIG. 3 illustrates an example process 300 associated with forming a structure of a UAV 100 for fragmentation, according to examples of the present disclosure.

At 302, the process 300 may include determining one or more first characteristic(s) associated with a mission of a UAV. In some instances, the one or more first characteristic(s) may be associated with a target of the UAV 100. For example, the one or more first characteristic(s) may be associated with a size of the target, an intended destruction of the target, etc. The one or more first characteristic(s) may also be associated with a stealth required of the mission, an environment of the mission (e.g., temperature, humidity, elevation, etc.), a size, weight, etc., of the UAV 100, and so forth. The one or more first characteristic(s) may also be based on an amount of munition(s) onboard the UAV 100.

At 304, the process 300 may include determining, based at least in part on the one or more first characteristics, a structure of the UAV to manufacture from a high-strength reactive alloy. For example, as discussed herein, forming a structure of the UAV 100 from a high-strength reactive alloy may increase a destructiveness of the UAV 100 upon impacting the target. Example structures include brackets, mounts, frames, panels, sheets, wings, ailerons, propellers, etc. In some instances, the structure by which to manufacture from the high-strength reactive alloy may be based on the intended destruction of the target. For example, where a smaller destruction is desired, a smaller structure or less of a structure of the UAV may be manufactured from the high-strength reactive alloy.

At 306, the process 300 may include determining, based at least in part on the one or more first characteristic(s) and/or the structure, one or more second characteristic(s) associated with a destructiveness of the structure. For example, the high-strength reactive alloy may be manufactured with predetermined yield strengths, elastic strain limits, and/or enthalpies of oxidation according to its desired destructiveness. The resulting size of the fragments may depend upon an intended target and/or a desired combination of blast versus kinetic energy projectiles.

In addition, the high-strength reactive alloy may be manufactured with a predetermined GLF according to its desired destructiveness. For example, designing the high-strength reactive alloy to have a predetermined GLF may control a blast or projectiles of the high-strength reactive alloy. In some instances, the greater the GLF the smaller the fragments, or stated alternatively, the smaller the GLF the larger the fragments. The high-strength reactive alloy may be designed according to the desired fragment size. In some instances, smaller fragments may be associated with a greater blast, while larger fragments may be associated with a reduced blast but an increase in projectiles.

In some instances, the fragmentation may also be achieved by forming shapes, grooves, notches, etc., in the high-strength reactive alloy. In some instances, these grooves may be fabricated onto or into the high-strength reactive alloy using various methods, such as direct machining, etching, milling, as-cast shaping and near-to-net shape thermoplastic forming. When larger projectiles are desired, the grooves may be shaped apart by greater distances and/or disposed by lesser distances into the surface of the high-strength reactive alloy than if smaller projectiles are desired, whereby the grooves may be more closely located to one another and/or may be formed deeper into the surface of the high-strength reactive alloy.

At 308, the process 300 may include forming the structure based at least in part on the one or more second characteristic(s). For example, the high-strength reactive alloy may be manufactured to have the second characteristic(s). In some instances, the high-strength reactive alloy may be manufactured by casting, thermoplastic forming, rolling, stamping, etc. The method of manufacturing may be based on the structure. For example, casting may be used when the structure is a bracket within the UAV. Comparatively, where the structure is a panel of a wing, rolling may be used.

Although the process 300 illustrates the formation of the structure, additional structures of the UAV 100 may be manufactured using processes that are similar to or different than the process 300. In some instances, the structures may include different or similar high-strength reactive alloys, whereby the high-strength reactive alloys may have different characteristics (e.g., fragmentation distribution).

Figure 4:
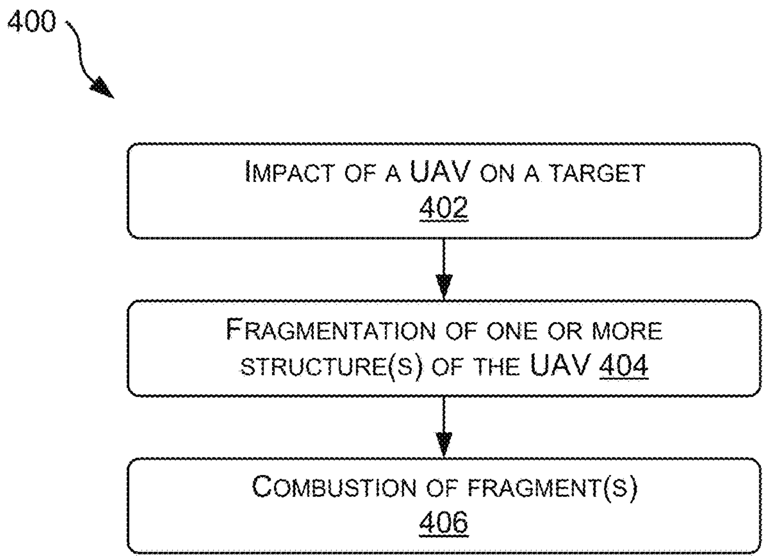
FIG. 4 illustrates an example fragmentation of a high-strength reactive alloy of the UAV of FIG. 1, according to an example of the present disclosure.

FIG. 4 illustrates an example process 400 associated with a fragmentation of a structure of the UAV 100, according to examples of the present disclosure.

At 402, the process 400 may include an impact of the UAV on a target. For example, the UAV 100 may impact the target. The control system 122, the navigation system 124, the propulsion system 104, etc., may be used to direct the UAV 100 to the target.

At 404, the process 400 may include a fragmentation of one or more structures of the UAV. The structures of the UAV 100 that are fragmented may be high-strength reactive alloys, such as BMGs. In some instances the structures of the UAV 100 may be fragmented upon impact of the UAV 100 on its target, and/or based on the munition(s) 108 of the UAV 100 detonating. As discussed herein, an amount of fragmentation, such as a fragmentation distribution, or a size of the fragment(s) may be based on characteristics of the high-strength reactive alloy.

At 406, the process 400 may include combustion of the fragments. For example, the high-strength reactive alloy may include early transition metals with a high affinity to oxygen such that oxide-free surfaces readily react and combust with oxygen and/or nitrogen. The UAV 100 may store substantial mechanical energy during impact of the UAV 100 on a target. Once fragmentation of the high-strength reactive alloy begins, the stored mechanical energy facilitates the formation of fragments. The stored mechanical energy from the initial stages of the rapid impulsive loading preceding and/or associated with the initiation of fragmentation may produce a large amount of free surfaces, which are oxide-free from the high-strength reactive alloy. The opening of the oxide-free surfaces from the high-strength reactive alloys, and especially with the formation of the fragments, may prompt reaction initiation and increase a destructiveness of the UAV.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An unmanned aerial vehicle (UAV) comprising:
- a fuselage;
- one or more aerodynamic components including a wing; and
- a high-strength reactive alloy that forms at least a portion of the fuselage and the one or more aerodynamic components, the high-strength reactive alloy being configured to fragment to generate at least one of a blast or projectiles upon impact of the UAV on a target.

2. The UAV of claim 1, wherein the high-strength reactive alloy is a bulk metallic glass.

3. The UAV of claim 1, wherein the high-strength reactive alloy has an elastic strain limit of at least 1.5% and a yield strength of at least 200 kilopounds per square inch.

4. The UAV of claim 1, wherein the high-strength reactive alloy has an enthalpy of oxidation of at least 1,800 calories per gram and a yield strength of at least 200 kilopounds per square inch.

5. The UAV of claim 1, wherein:

the high-strength reactive alloy is configured to have a first surface area in a first state;

the high-strength reactive alloy has a second surface area when forming the at least the portion of the fuselage and the one or more aerodynamic components in a second state; and a ratio of the second surface area to the first surface area is at least 1.5.

6. The UAV of claim 1, wherein the at least the portion of the fuselage and the one or more aerodynamic components is formed via casting or thermoforming.

7. The UAV of claim 1, wherein the high-strength reactive alloy has a honeycomb structure.

8. An unmanned aerial vehicle (UAV) structure comprising:

a high-strength reactive alloy in bulk metallic glass form, wherein:

the high-strength reactive alloy is configured to have a first surface area in cubic form in a first state;

the high-strength reactive alloy has a second surface area when forming the UAV structure in a second state, the second state being different than the first state;

a ratio of the second surface area to the first surface area is at least 1.5; and the high-strength reactive alloy has a density less than 6.6 g/cc.

9. The UAV structure of claim 8, wherein the UAV structure is at least a portion of a wing, a fuselage, a propulsion system, or a frame.

10. The UAV structure of claim 8, wherein: the ratio of the second surface area to the first surface area is at least 3.0.

11. The UAV structure of claim 8, wherein the high-strength reactive alloy has an elastic strain limit of at least 1.5% and a yield strength of at least 200 kilopounds per square inch.

12. The UAV structure of claim 8, wherein the high-strength reactive alloy has an enthalpy of oxidation of at least 1,800 calories per gram and a yield strength of at least 200 kilopounds per square inch.

13. The UAV structure of claim 8, wherein the high-strength reactive alloy has a tubular shape.

14. The UAV structure of claim 8, wherein the high-strength reactive alloy is configured to generate a blast upon impact of the UAV structure on a target based at least in part on oxide-free surfaces of fragments of the high-strength reactive alloy reacting with oxygen.

15. An unmanned aerial vehicle (UAV) comprising:

a munition; and a wing formed at least in part by a high-strength reactive alloy, the high-strength reactive alloy including an elastic strain limit of at least 1.5% and a yield strength of at least 200 kilopounds per square inch, wherein the high-strength reactive alloy is configured to fragment based at least in part on detonation of the munition or impact of the UAV on a target.

16. The UAV of claim 15, wherein the high-strength reactive alloy has an enthalpy of oxidation of at least 1,800 calories per gram.

17. The UAV of claim 15, further comprising a fuselage, a propulsion system, or a frame formed from a second high-strength reactive alloy.

18. The UAV of claim 15, wherein:

the high-strength reactive alloy is configured to have a first surface area in a first state;

the high-strength reactive alloy has a second surface area when formed as the wing in a second state; and a ratio of the second surface area to the first surface area is at least 6.

19. The UAV of claim 15, wherein the high-strength reactive alloy is a bulk metallic glass.

20. The UAV of claim 17, wherein the second high-strength reactive alloy is different than the high-strength reactive alloy.

* * * * *